US006508084B1

(12) United States Patent
Yokota et al.

(10) Patent No.: US 6,508,084 B1
(45) Date of Patent: Jan. 21, 2003

(54) METHOD FOR PRODUCING OPTICAL QUARTZ GLASS FOR EXCIMER LASERS AND VERTICAL-TYPE HEATING FURNACE

(75) Inventors: Toru Yokota, Koriyama (JP); Hiroyuki Nishimura, Koriyama (JP); Akira Fujinoki, Koriyama (JP)

(73) Assignees: Heraeus Quarzglas GmbH & Co. KG, Hanua (DE); Shin-Etsu Quartz Products Co., Ltd., Tokyo (JP)

(*) Notice: Subject to any disclaimer, the term of this patent is extended or adjusted under 35 U.S.C. 154(b) by 0 days.

(21) Appl. No.: 09/527,655

(22) Filed: Mar. 17, 2000

(30) Foreign Application Priority Data

Mar. 17, 1999 (JP) .......................................... 11-071952

(51) Int. Cl.[7] .......................... C03B 37/018; G02B 6/18

(52) U.S. Cl. ............................. 65/424; 65/421; 65/422; 65/426; 65/378; 65/157; 65/900; 65/DIG. 8

(58) Field of Search .......................... 65/421, 422, 424, 65/426, 378, 157, 900, DIG. 8

(56) References Cited

U.S. PATENT DOCUMENTS 5,145,510 A * 9/1992 Saito et al. ................... 65/900
5,326,729 A * 7/1994 Yaba et al.

FOREIGN PATENT DOCUMENTS

| | | | |
|---|---|---|---|
| EP | A2-401845 | | 12/1990 |
| EP | 00105686 | | 2/2001 |
| JP | A-Hei 3-88742 | | 4/1991 |
| JP | 03247522 | | 11/1991 |
| JP | A-Hei 267662 | | 3/1994 |
| JP | 06166528 | | 6/1994 |
| JP | 06234536 | | 8/1994 |
| JP | 7-84327 | * | 9/1995 |
| JP | 8-12365 | | 1/1996 |
| JP | 08012365 | | 1/1996 |
| JP | 11001331 | | 1/1999 |
| JP | 11-240728 | * | 9/1999 |
| JP | 11240728 | | 9/1999 |
| JP | A-Hei 10-371084 | | 7/2000 |

* cited by examiner

*Primary Examiner*—Michael Colaianni
(74) *Attorney, Agent, or Firm*—Milde & Hoffberg LLP

(57) ABSTRACT

A method for producing an optical quartz glass for use in excimer lasers, comprising a step of forming a porous silica preform by depositing silica in a soot-like form formed by flame hydrolysis of a high-purity volatile silicon compound, followed by a step of vitrifying said porous silica preform into transparent glass in an atmosphere containing water vapor and hydrogen, and a vertical type heating furnace for carrying out the production method therein.

5 Claims, 1 Drawing Sheet

12
11
13
10
9
1
3
2
8
6
4
7
5

METHOD FOR PRODUCING OPTICAL QUARTZ GLASS FOR EXCIMER LASERS AND VERTICAL-TYPE HEATING FURNACE

DETAILED DESCRIPTION OF THE INVENTION

1. Field of Use

The present invention relates to a method for producing an optical quartz glass for use in excimer lasers. Specifically, it relates to a method for producing an optical quartz glass suitable for making an optical system of a lithographic system using an excimer laser radiation as the light source. It also relates to a method for producing a synthetic quartz glass for use in the optical system of an ArF excimer laser lithographic system, such as a large lens, prism, or beam splitter, and to a vertical furnace for carrying out the production method.

2. Prior Art

With the recent increase in the degree of integration in LSIs, the integrated circuits patterned on wafers are becoming finer, and mass production of Ultra LSIs provided with ultrafine patterns in the order of a quarter micron (0.25 $\mu$m) or even finer is now under way. To obtain such ultrafine patterns, it is necessary to use exposure light sources having still shorter wavelengths, and, steppers using excimer laser radiation as the light source have been developed. Steppers equipped with KrF excimer laser radiation (248 nm in wavelength) are already in practical use, and steppers using ArF excimer laser radiation (193 nm in wavelength) as the light source is attracting much attention as a promising stepper of the next generation. As a glass material which exhibits sufficiently high transmittance in the short wavelength region of the KrF excimer laser and ArF excimer laser radiation, there can be mentioned quartz glass, fluorite, etc. As an optical material for lithography using excimer laser radiation as the light source, it is preferred to use a synthetic quartz glass prepared by vitrification into a transparent glass from a product obtained by flame hydrolysis of a high purity silicon compound and the like because it exhibits high transmittance in the short wavelength region of 260 nm or less.

However, if excimer laser radiation such as those of the KrF excimer lasers and ArF excimer lasers are irradiated for a long duration of time to the synthetic quartz glass above, paramagnetic defects known as E' centers or NBOH centers (NBOHC) are generated inside the synthetic quartz glass and impair long time stability, because the excimer lasers yield high energy pulse radiation with a life of about 20 nanoseconds. As a means to solve such problems, JP-A-Hei3-88742 proposes a method of doping the synthetic quartz glass body with hydrogen. However, this method may lead to a generation of reducing defects in the synthetic quartz glass during its production process, and these defects easily cause breakdown of the glass structure upon irradiation of the excimer laser radiation and yield paramagnetic defects. The resulting defects then generate an undesirable absorption band at a wavelength of 215 nm, thereby considerably deteriorating the transmittance of excimer laser radiation, particularly, that of the ArF excimer laser radiation. The paramagnetic defects mentioned above are the oxygen deficient type defects which are generated as a result of the combination of Si in the quartz glass structure ($SiO_2$) with a less than stoichiometric quantity of oxygen. In JP-A-Hei6-166528 a method is proposed to prevent the generation of these parametric defects from occurring, which comprises subjecting the quartz glass to an oxidation treatment in the temperature range of from 600 to 1500° C. under an atmosphere containing oxygen, followed by a treatment in the temperature range of from 300 to 600° C. under an atmosphere containing hydrogen. However, this method suffered a disadvantage because the treatment in the hydrogen atmosphere was performed at such a low temperature range of from 300 to 600° C. Therefore, the diffusion rate of hydrogen into the synthetic quartz glass body was too low and required an extremely long duration of time. In particular, for the optical system with larger aperture and increased thickness, which is required with the increase in the exposure area, the method was found industrially unfeasible because the hydrogen treatment of the optical system at that temperature range required a duration of several months or longer.

However, to efficiently prevent the reducing defects that are generated during the hydrogen treatment of the synthetic quartz glass, it seems to be effective to first incorporate oxygen excessive type defects in the quartz glass followed by a hydrogen treatment. Therefore, a production method of optical quartz glass for excimer lasers was developed which comprises forming a porous silica preform by depositing silica in a soot,like form produced by flame hydrolysis of a high purity volatile silicon compound on a base body followed by heating the resulting porous silica preform to vitrify it into a transparent body and thermally heating it in a reducing atmosphere, as described in Japanese patent application Hei10-371084. However, this method is disadvantageous in that the production cost becomes high, because the optical quartz glass for use in excimer lasers is produced in two steps, i.e., by performing heat treatment in a reducing atmosphere after vitrifying the preform in an oxidizing atmosphere to obtain the transparent body.

SUMMARY OF THE INVENTION

An object of the present invention is to provide a method for producing an optical quartz glass for use in excimer lasers having excellent transmittance of and resistance against laser radiation at a low cost.

Another object of the present invention is to provide a method for producing a large optical quartz glass for use in ArF excimer lasers still having excellent transmittance and resistances against ArF laser radiation, yet at a low cost.

A still other object of the present invention is to provide a vertical heating furnace for carrying out therein the aforementioned production methods.

The objects above are accomplished by a method for producing an optical quartz glass for use in excimer lasers, comprising a step of forming a porous silica preform by depositing silica in a soot-like form formed by flame hydrolysis of a volatile silicon compound, and a step of vitrifying said porous silica preform into transparent glass in an atmosphere containing water vapor and hydrogen, as well as to a vertical heating furnace for performing therein the production method above.

Examples of volatile silicon compounds are silicon tetrachloride, methyl trimethoxysilane, tetramethoxysilane, etc. These compounds are available at high purity. By subjecting them to flame hydrolysis, $SiO_2$-particles are deposited on a rotating heat-resistant base body to form a porous silica preform, a silica in a soot-like form (referred to hereinafter as a soot body). In the present invention, the soot body is then heated in an atmosphere containing water vapor and hydrogen for vitrification to obtain a transparent body.

The heating is preferably performed in a temperature range of from 1400 to 1700° C., but more preferably, in a temperature range of from 1500 to 1600° C. At a temperature lower than that range, the soot body generates melt residues, and at a temperature higher than 1700° C., the treatment furnace undergoes deformation to bring about a dangerous state.

Concerning the atmosphere containing water vapor and hydrogen, preferably, the water vapor concentration is in a range of from 1 to 20% by volume and the hydrogen concentration is in a range of from 20 to 90% by volume. If the water vapor concentration is lower than 1% by volume, the resulting quartz glass yields a poor resistance against laser radiation, and if the water vapor concentration should exceed 20% by volume, bubbles may remain inside the resulting quartz glass. If the hydrogen concentration is lower than 20% by volume, there would be no improvement in the resistance against laser radiation, and if the hydrogen concentration should exceed 90% by volume, the transmittance of laser radiation would be impaired due to the presence of reducing defects.

As other gaseous components to be included in the above atmosphere containing water vapor and hydrogen, there can be mentioned inert gases such as He, Ar, and $N_2$.

In vitrifying the soot body into a transparent product, it is preferred that the soot body is first densified and then subjected to vitrification to obtain the transparent body. By thus performing the densification, a synthetic quartz glass body improved in shapeability can be obtained without causing deformation during the vitrification into a transparent body. Furthermore, the densification has another advantage that it improves the optical uniformity of the synthetic quartz glass body. The preheating above is preferably performed in an inert gas or in an oxidizing gas in the temperature range of from 800 to 1400° C.

DESCRIPTION OF THE PREFERRED EMBODIMENTS

Figure 1:
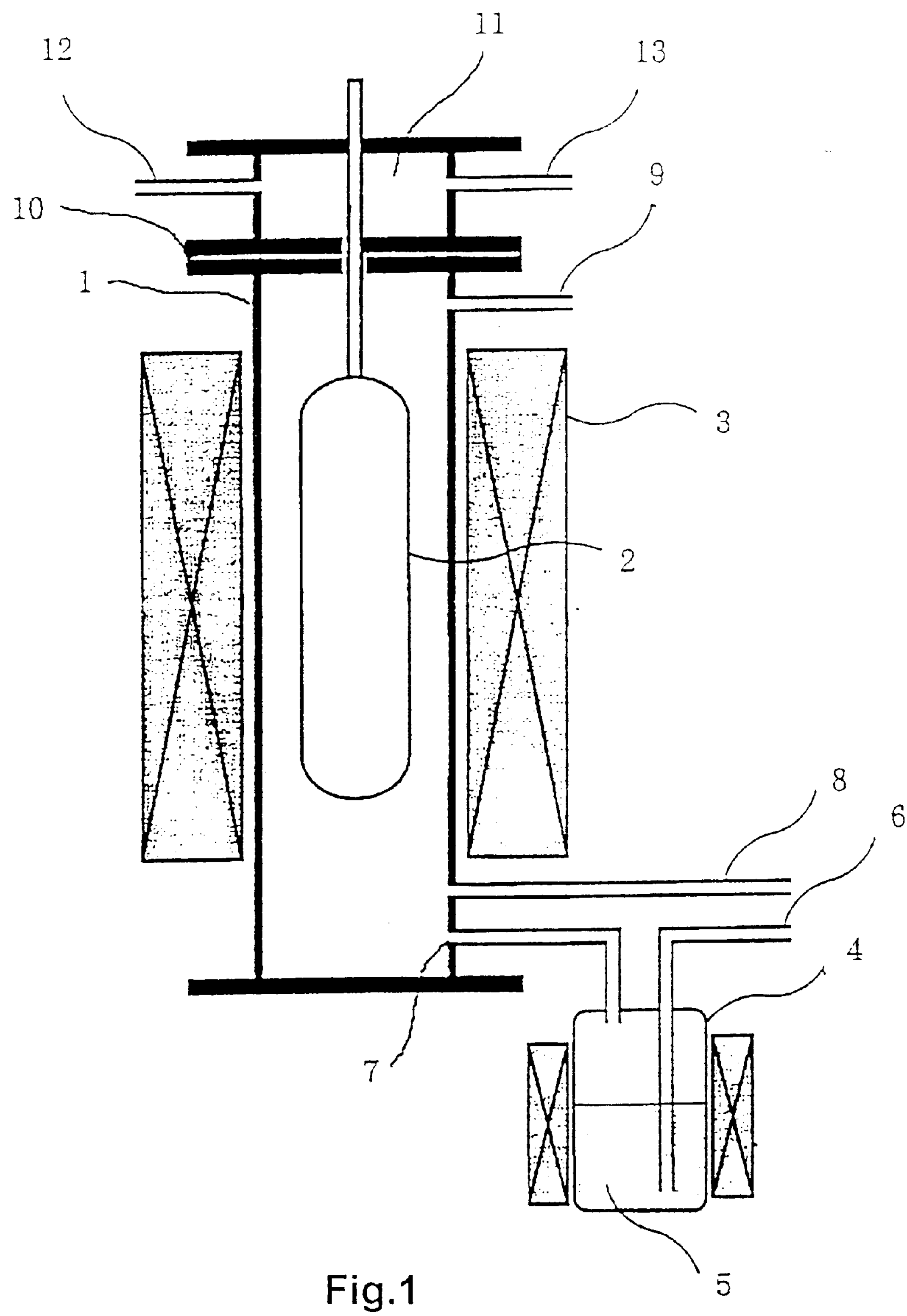
FIG. 1 shows an embodiment of a vertical heating furnace according to the present invention in which the porous silica preform is vitrified into a transparent body.

Referring to FIG. 1, there are shown a quartz furnace core tube 1, a soot body 2, a thermal heater 3, a water vapor generating apparatus 4, water 5, an inlet for introducing a carrier gas 6, an inlet for introducing water vapor 7, an inlet for introducing gaseous hydrogen 8, an outlet for discharged gas 9, a shielding lid 10, a hydrogen gas diluting chamber 11, an inlet for introducing gaseous nitrogen 12, and an outlet for discharging gaseous nitrogen 13.

As shown in FIG. 1, the soot body 2 is supported in a vertical orientation by a supporting member (not shown) inside the quartz furnace core tube 1 provided in the vertical heating furnace. Then, while heating the soot body by using the thermal heater provided around the quartz furnace core tube 1, water vapor and gaseous hydrogen are introduced from the inlet for introducing water vapor 7 and the inlet for introducing gaseous hydrogen 8 both provided at the lower portion of the quartz furnace core tube 1, to thereby perform the vitrification of the soot body into a transparent body. The quantity of water vapor and gaseous hydrogen introduced is controlled by flow rate controllers provided in the inlet tubes connected to the inlet for introducing water vapor 7 and the inlet for introducing gaseous hydrogen 8. The hydrogen gas diluting chamber 1 is provided in the head portion of the quartz furnace core tube, so that gaseous hydrogen leaking from the shielding lid 10 of the quartz furnace core tube 1 is diluted by the gaseous nitrogen introduced from the inlet for introducing gaseous nitrogen 12 and then discharged to the outside from the outlet for discharging gaseous nitrogen 13. The heated synthetic quartz glass body thereby vitrified into a transparent product is gradually pulled up while the support member is rotating it. The water vapor supplied to the quartz furnace core tube 1 is introduced being accompanied by the carrier gas, which is accomplished by introducing the carrier gas bubbling into the water 5 that is provided inside the vapor generating apparatus 4. As described above, in the vertical type-heating furnace according to the present invention, gaseous hydrogen is diluted to a range below the explosion limit and discharged. Thus, the soot body can be completely vitrified into a transparent body without causing any explosion attributed to gaseous hydrogen.

If necessary, homogenization treatment, shaping, and annealing treatment are carried out subsequent to the vitrification of the soot body into a transparent product above. The homogenization treatment can be conducted by maintaining the body at a high temperature of 1800° C. or higher in a refractory furnace, and shaping is performed inside a high temperature crucible set at a temperature of 1600° C. or higher. Although the annealing treatment is carried out at a relatively low temperature in the vicinity of cooling point (1120° C.) of the quartz glass, it requires a long duration of 10 hours or even longer. Since the homogenization treatment and shaping requires a high temperature for the treatment and the annealing treatment requires a long duration of time, they contaminate the synthetic quartz glass body due to the impurities from the furnace material, supporting members, atmosphere, etc. In particular, the contamination by Na is serious, and it greatly influences the drop in transmittance of the ArF excimer laser. For homogenization, treatment without using any furnace material (described in JP-A-Hei-267662) is recommended. However, contamination of the synthetic quartz glass molding occurs due to the homogenization treatment, molding, and annealing treatment. If the content of Na falls in a range of from 24 to 60 ppb, the transmittance of the synthetic quartz glass member can be easily recovered by use of a continuous ultraviolet radiation 260 nm in wavelength or shorter for a long duration of time. In particular, the internal transmittance of ArF excimer laser radiation can be recovered to 99.8% or higher. As the lamp for use in irradiating the continuous ultraviolet radiation, one can employ a low vapor pressure mercury lamp providing a radiation having a principal wavelength of 253.7 nm and 184.9 nm, a Xe excimer lamp which radiates a light having a wavelength of 172 nm, or a KrCl excimer lamp which radiates a light having a wavelength of 222 nm. The luminance of the ultraviolet radiation is preferably 1 $mW/cm^2$ or higher, and the duration of irradiation is preferably 50 hours or longer.

Definitions

The physical properties described below in Examples and Comparative Examples are values obtained by the following measuring methods:

Distribution of refractive indices: Measurements were made using a Fizeau's interferometer.

Birefringence: Measurements were made in accordance with crossed nicols method.

Striae: Visual observation.

Internal transmittance of light 193 nm in wavelength: Apparent transmittance "T" in % was obtained at a thickness of 10 mm, and a reduced value was calculated in accordance with the equation (T/90.68)×100, where 90.68% is a value obtained by subtracting the loss, i.e., 0.18%, known to be attributed to Rayleigh scattering, from the theoretical transmittance 90.68% of the quartz glass for a light 193 nm in wavelength.

Hydrogen molecule concentration: A measurement method described by V.S. Khotimchenko et al., J. Appl. Spectrosc., 46, pp. 632–635 (1987) was employed.

EXAMPLES

Examples of the present invention are described below, but it should be understood that the present invention is not limited thereto.

Example 1

Silica in a soot-like form was prepared by means of flame hydrolysis comprising introducing silicon tetrachloride accompanied by gaseous oxygen into an oxyhydrogen flame, and was deposited on a rotating heat-resistant base body to obtain a soot body. The soot body thus obtained yielded a low density outer portion, whereas its inner portion exhibited a relatively high density. The average bulk density of the soot body was found to be 1.2 g/cm$^3$. The resulting soot body was subjected to pre-sintering to yield a homogeneous density by heating at 1000° C. for a duration of 8 hours in a pre-heating furnace (not shown) under an atmosphere consisting of 20% by volume of oxygen and 80% by volume of nitrogen. The bulk density of the soot body was increased to 1.5 g/cm$^3$ by the pre-sintering, and the density distribution was decreased. Then, the soot body was suspended inside the quartz furnace core tube 1 of the vertical type heating furnace shown in FIG. 1, and water vapor as well as hydrogen were introduced from the water vapor inlet 7 and the hydrogen inlet 8. The water vapor was introduced with gaseous He in which water vapor is mixed, obtained by introducing gaseous He into the water vapor generating apparatus 4 and by bubbling the water placed inside the apparatus. Subsequently, the atmosphere inside the quartz furnace core tube was controlled to a mixed gas atmosphere containing 5% by volume of water vapor, 40% by volume of hydrogen, and 55% by volume of He. The gas was controlled by using a flow controller (not shown) provided to a tube connected to the water vapor inlet 7 and the hydrogen inlet 8, the open ends of which are set in the quartz furnace core tube. The quartz furnace core tube 1 was heated to a temperature of 1550° C. by a thermal heater 3 provided around the furnace core tube. The soot body was gradually pulled up by the supporting member while being vitrified to obtain a transparent body. The OH concentration of the quartz glass body obtained thereby was found to be 90 ppm, and the hydrogen concentration was $2\times10^{18}$ molecules/cm$^3$. The resulting quartz glass body was mounted on a high purity graphite crucible, and was heated to 1800° C. under a nitrogen-purged atmosphere so as to obtain a molding by its own weight into a disk having an outer diameter of 250 mm and a height of 100 mm.

The portion of the molding that was brought into contact with the peripheral graphite was sufficiently removed by an HF etching treatment. The resulting molding was subjected to annealing treatment. The annealing treatment was performed by heating at 1150° C. for a duration of 20 hours in air. This treatment was followed by gradually cooling to 600° C. at a cooling rate of 5° C./hour, and, from that temperature, the molding was allowed to cool. The refractive index distribution (Δn) was found to be $1\times10^6$, and the birefringence was 1 nm/cm or lower. No striae in three directions nor layer structure was observed. The concentration of OH groups was 90 ppm, and that of the hydrogen molecules was $1.5\times10^{18}$ molecules/cm$^3$. A sample 60 mm in diameter and 10 mm in thickness was cut out of the molding to measure the transmittance thereof Then, ArF excimer laser radiation was irradiated in pulses for a predetermined number of pulses at an energy density of 20 mJ/cm$^2$ and at a frequency of 200 Hz to the same sample, to thereby observe the change in transmittance and in refractive index. As a result, it has been found that the transmittance before irradiating the ArF excimer laser radiation was 99.8%, whereas the transmittance after irradiating the ArF excimer laser radiation for $1\times10^5$ pulses was found to be 99.8%, and that after irradiation for $2\times10^7$ pulses was 99.7%. Furthermore, no shrinkage ascribed to the laser irradiation was observed.

Examples 2 to 7 and Comparative Examples 1 to 6

Pre-sintered soot bodies were prepared in the same manner as in Example 1, and were vitrified into transparent products by heating them at 1550° C. in an atmosphere whose water vapor concentration and hydrogen concentration were varied. The change in transmittance of the quartz glass bodies was observed after repeatedly irradiating them with a laser. The properties of the quartz glass irradiated with an ArF excimer laser were determined. The difference between the transmittance of the non-irradiated body and that after irradiating the ArF excimer laser for $1\times10^5$ pulses was taken as the initial property, and the difference between the transmittance of the non-irradiated body and that after irradiating the ArF excimer laser for $2\times10^7$ pulses was taken as the long-term property. Furthermore, the hydrogen concentration of the quartz glass was obtained.

The results are given in Table 1.

TABLE 1

| | Water vapor concentr. (vol.-%) | Hydrogen concentr. (vol.-%) | Initial property (%) | Long-term property (%) | $H_2$ molecule concentr. (molecucles/cm$^3$) |
|---|---|---|---|---|---|
| Example 2 | 1 | 20 | 0.1 | 0.2 | $5\times10^{17}$ |
| Example 3 | 5 | 20 | 0 | 0.1 | $5\times10^{17}$ |
| Example 4 | 10 | 20 | 0 | 0.1 | $5\times10^{17}$ |
| Example 5 | 20 | 20 | 0 | 0.1 | $5\times10^{17}$ |
| Example 6 | 10 | 50 | 0 | 0.1 | $2\times10^{18}$ |
| Example 7 | 10 | 90 | 0.1 | 0.1 | $5\times10^{18}$ |
| Comp. Ex. 1 | 0.5 | 10 | 0.1 | 0.4 | $5\times10^{17}$ |
| Comp. Ex. 2 | 1 | 10 | 0.1 | 0.4 | $2\times10^{17}$ |
| Comp. Ex. 3 | 10 | 10 | 0 | 0.3 | $2\times10^{17}$ |
| Comp. Ex. 4 | 20 | 10 | 0 | 0.3 | $2\times10^{17}$ |
| Comp. Ex. 5 | 30 | 10 | 0 | 0.3 | $3\times10^{17}$ |
| Comp. Ex. 6 | 30 | 10 | 0 | 0.1 | $5\times10^{17}$ |

From Table 1 above, it can be seen that the synthetic quartz glasses prepared by vitrifying the soot bodies each into transparent products in an atmosphere containing from 1 to 20% by volume of water vapor and from 20 to 90% by volume of hydrogen yield a hydrogen concentration of $5\times10^{17}$ molecules/cm$^3$ or higher with excellent long-term properties. In contrast to those, the synthetic quartz glasses prepared by vitrifying the soot bodies into transparent products in an atmosphere containing water vapor and hydrogen each at concentrations falling out of the ranges above, as shown in Comparative Examples 1 to 5 above, yield a low hydrogen concentration and are inferior in long-term properties. Furthermore, although the quartz glass obtained in Comparative Example 6 above contains hydrogen at a high concentration and yields an excellent long-term property, the quartz glass was not favorable because of the residual bubbles.

Examples 8 to 10 and Comparative Examples 7 and 8

Quartz glass bodies were obtained in the same manner as in Example 2, except for changing the atmosphere inside the quartz furnace core tube so that the water vapor concentration was 10% by volume and that of hydrogen was 50% by volume. The hydrogen molecule concentration of the quartz glass bodies was measured, and the results are given in Table 2.

TABLE 2

| | Vitrification temperature (° C.) | $H_2$ molecule conc. (molecules./$cm^3$) | Note |
|---|---|---|---|
| Comp. Ex 7 | 1350 | $4 \times 10^{17}$ | Melt residue |
| Example 8 | 1450 | $8 \times 10^{17}$ | |
| Example 9 | 1550 | $2 \times 10^{18}$ | |
| Example 10 | 1650 | $3 \times 10^{18}$ | Slight Deformation of core tube |
| Comp. Ex. 8 | 1750 | $4 \times 10^{18}$ | Deformation of core tube |

From Table 2 above, in the case where the vitrification temperature was set at 1350° C., a white opaque portion was observed, presumably ascribable to the presence of melt residue. Furthermore, the process at a vitrification temperature of 1750° C. was dangerous because the furnace core tube was found to undergo deformation.

According to the production method of the present invention, a highly laser-resistant optical quartz glass which also has a high transmittance for excimer laser radiation can be readily produced by vitrification in an atmosphere containing water vapor and hydrogen, and a low production cost. In particular, even in case of producing a large optical quartz glass body, the present invention favorably enables a thick optical quartz glass having large diameter for use in ArF excimer lasers, which exhibits uniform transmittance and laser resistance. Furthermore, the vertical type heating furnace for use in the present invention enables safe vitrification without causing any explosion due to the leakage of hydrogen. Thus, the present invention is highly valuable in the industry.

The foregoing specification and drawings have thus described and illustrated a novel improved method for producing optical quartz glass for excimer lasers and a vertical-heating furnace therefor, which fulfills all the desired objects and advantages. Many changes, modifications, variations and other uses and applications of the subject invention will, however, become apparent to those skilled in the art after considering this specification which discloses the preferred embodiments thereof All such changes, modifications, variations and other uses and applications which do not depart from the spirit and scope of the invention are deemed to be covered by the invention, which is to be limited only by the claims which follow.

What is claimed is:

1. A method for producing an optical quartz glass for use in excimer lasers, comprising a step forming a porous silica preform by depositing silica in a soot-like form formed by flame hydrolysis of a volatile silicon compound, and a step of vitrifying said porous silica preform into transparent glass in an atmosphere containing water vapor and hydrogen, wherein the atmosphere containing water vapor and hydrogen has a water vapor concentration of from 1 to 20% by volume and a hydrogen concentration of from 20 to 90% by volume.

2. A method for producing an optical quartz glass for use in excimer lasers as claimed in claim 1, wherein the temperature of vitrifying the porous silica preform into transparent glass is in a range of from 1400 to 1700° C.

3. A method for producing an optical quartz glass for use in excimer lasers as claimed in claim 1, wherein the porous silica preform is subjected to a preheating treatment in an inert gas or an oxidizing gas atmosphere before the vitrification.

4. A method for producing an optical quartz glass for use in excimer lasers as claimed in claim 2, wherein the porous silica preform is subjected to a preheating treatment in an inert gas or an oxidizing gas atmosphere before the vitrification.

5. A method for producing an optical quartz glass for use in excimer lasers as claimed in claim 3, wherein the temperature of the preheating treatment is in a range of from 800 to 1400° C.

* * * * *